(12) United States Patent
Naoi et al.

(10) Patent No.: US 10,490,316 B2
(45) Date of Patent: *Nov. 26, 2019

(54) TITANIUM OXIDE PARTICLES, TITANIUM OXIDE PARTICLE PRODUCTION METHOD, POWER STORAGE DEVICE ELECTRODE INCLUDING TITANIUM OXIDE PARTICLES, AND POWER STORAGE DEVICE PROVIDED WITH ELECTRODE INCLUDING TITANIUM OXIDE PARTICLES

(71) Applicant: Nippon Chemi-Con Corporation, Shinagawa-ku, Tokyo (JP)

(72) Inventors: Katsuhiko Naoi, Tokyo (JP); Wako Naoi, Tokyo (JP); Satoru Tsumeda, Tokyo (JP); Shuichi Ishimoto, Tokyo (JP); Kenji Tamamitsu, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/558,169

(22) PCT Filed: May 27, 2015

(86) PCT No.: PCT/JP2015/065204
§ 371 (c)(1),
(2) Date: Sep. 13, 2017

(87) PCT Pub. No.: WO2016/157551
PCT Pub. Date: Oct. 6, 2016

(65) Prior Publication Data
US 2018/0072584 A1    Mar. 15, 2018

(30) Foreign Application Priority Data
Mar. 31, 2015   (JP) .................... 2015-074272

(51) Int. Cl.
*H01B 1/08* (2006.01)
*H01M 4/04* (2006.01)
(Continued)

(52) U.S. Cl.
CPC ............. *H01B 1/08* (2013.01); *C01G 23/005* (2013.01); *C01G 23/04* (2013.01); *C01G 23/043* (2013.01);
(Continued)

(58) Field of Classification Search
CPC .. H01B 1/06; H01B 1/08; H01M 4/13; H01M 4/131; H01M 4/485; H01M 4/505;
(Continued)

(56) References Cited

U.S. PATENT DOCUMENTS 5,173,215 A * 12/1992 Clarke ................... C04B 35/46
423/608
8,377,342 B2 * 2/2013 Ellis ..................... C01G 23/043
148/421
(Continued)

FOREIGN PATENT DOCUMENTS

CN    102496704 A    6/2012
CN    102884003 A    1/2013
(Continued)

OTHER PUBLICATIONS

English machine translation of Fukita et al. JP 09309728 A (Year: 1997).*

(Continued)

*Primary Examiner* — Harold Y Pyon
*Assistant Examiner* — Matthew R Diaz
(74) *Attorney, Agent, or Firm* — Shapiro, Gabor and Rosenberger, PLLC

(57) ABSTRACT

Provided are novel titanium oxide particles, production method thereof, and applications which do not need a
(Continued)

conductive aid or minimize the conductive aid. Novel titanium oxide particles 1 employ a three-dimensional network structure in which multiple crystallites 2 are coupled in sequence, and a magneli phase 2a is formed on the surface of the crystallites 2. The crystallites 2 are oriented at random, coupled with each other via pinacoid or end surface, and laminated as the three-dimensional network structure. A large number of spaces 3 in nano size is present in the titanium oxide particles 1, a grain boundary of the bonding interface is eliminated between the crystallites 2, while a large number of pores is present.

14 Claims, 14 Drawing Sheets

(51) Int. Cl.
| | |
|---|---|
| H01M 4/131 | (2010.01) |
| H01M 4/1391 | (2010.01) |
| H01M 4/36 | (2006.01) |
| H01M 4/485 | (2010.01) |
| H01M 10/052 | (2010.01) |
| H01M 10/46 | (2006.01) |
| C01G 23/00 | (2006.01) |
| C01G 23/04 | (2006.01) |
| H01G 11/46 | (2013.01) |
| H01G 11/50 | (2013.01) |
| H01G 9/20 | (2006.01) |
| C25B 11/04 | (2006.01) |

(52) U.S. Cl.
CPC ........... *H01G 9/2031* (2013.01); *H01G 11/50* (2013.01); *H01M 4/0471* (2013.01); *H01M 4/131* (2013.01); *H01M 4/1391* (2013.01); *H01M 4/366* (2013.01); *H01M 10/052* (2013.01); *C01P 2002/32* (2013.01); *C01P 2004/04* (2013.01); *C01P 2004/45* (2013.01); *C01P 2004/84* (2013.01); *C01P 2006/14* (2013.01); *C01P 2006/16* (2013.01); *C01P 2006/40* (2013.01); *C25B 11/04* (2013.01); *H01G 11/46* (2013.01); *H01M 4/485* (2013.01); *H01M 10/465* (2013.01); *Y02E 60/366* (2013.01)

(58) Field of Classification Search
CPC .... H01M 4/362; H01M 4/366; H01M 10/052; H01M 10/46; H01M 10/465; H01M 4/0471; C01G 23/005; C01G 23/04; C01G 23/0432; H01G 11/46; H01G 11/50; H01G 9/2031; H01G 9/2036; C01P 2002/32; C01P 2004/04; C01P 2004/45; C01P 2004/84; C01P 2006/14; C01P 2006/16; C01P 2006/40
See application file for complete search history.

(56) References Cited

U.S. PATENT DOCUMENTS

| | | | |
|---|---|---|---|
| 9,005,814 B2 | 4/2015 | Naoi et al. | |
| 9,368,793 B2 | 6/2016 | Naoi et al. | |
| 2009/0042095 A1* | 2/2009 | Inagaki | C01G 23/005 429/92 |
| 2012/0251887 A1* | 10/2012 | Han | H01M 4/366 429/231.5 |
| 2013/0115516 A1 | 5/2013 | Naoi et al. | |
| 2014/0363568 A1 | 12/2014 | Suematsu et al. | |
| 2015/0108399 A1 | 4/2015 | Inagaki et al. | |
| 2015/0255790 A1 | 9/2015 | Naoi et al. | |
| 2015/0263337 A1 | 9/2015 | Naoi et al. | |
| 2017/0346090 A1 | 11/2017 | Hanawa et al. | |

FOREIGN PATENT DOCUMENTS

| | | | |
|---|---|---|---|
| EP | 3 236 481 A1 | | 10/2017 |
| JP | 09309728 A | * | 12/1997 |
| JP | 2005-332684 A | | 12/2005 |
| JP | 2009-043679 A | | 2/2009 |
| JP | 2011-236061 A | | 11/2011 |
| JP | 2012-169217 A | | 9/2012 |
| JP | 2013-073854 A | | 4/2013 |
| WO | WO 2007/028972 A1 | | 3/2007 |
| WO | WO 2014/034933 A1 | | 3/2014 |

OTHER PUBLICATIONS

Walsh et al., "The continuing development of Magneli phase titanium sub-oxides and Ebonex electrodes," Electrochim. Acta. (Year: 2010).*
Office Action dated May 15, 2018, in Japanese Patent Application No. 2016-073302.
Katsuhiko Naoi et al., "New hybrid supercapacitors and their prospects", Carbons, Jan. 15, 2013, No. 256, pp. 22 to 32.
International Search Report from International Patent Application No. PCT/JP2015/065204, dated Aug. 25, 2015.
Office Action dated Aug. 9, 2018 in Chinese Patent Application No. 201580078101.3.
Extended European Search Report dated Sep. 27, 2018, in European Patent Application No. 15887693.8.
Office Action dated Apr. 16, 2019, in Chinese Patent Application No. 201580078101.3.

* cited by examiner

| Ti-O DISTANCE OF Ti4O7 | 1.854 | 1.934 | 1.993 | 2.024 | 2.063 | 2.156 |
|---|---|---|---|---|---|---|
| Ti-O DISTANCE OF FINAL RESULTANT PRODUCT | 1.713 | 1.873 | 1.991 | | 2.053 | 2.317 |
| DIFFERENCE | −0.141 | −0.061 | −0.002 | +0.029 | +0.068 | +0.161 |

TITANIUM OXIDE PARTICLES, TITANIUM OXIDE PARTICLE PRODUCTION METHOD, POWER STORAGE DEVICE ELECTRODE INCLUDING TITANIUM OXIDE PARTICLES, AND POWER STORAGE DEVICE PROVIDED WITH ELECTRODE INCLUDING TITANIUM OXIDE PARTICLES

TECHNICAL FIELD

The present disclosure relates to titanium oxide particles.

BACKGROUND ART

Sintered particles of titanium oxides, such as titanium oxide represented by the general formula of $Ti_nO_{2n}$ and lithium titanate represented by the general formula of $Li_\alpha Ti_\beta O_\gamma$ are expected to be used in various applications due to the characteristics of titanium oxides.

For example, titanium oxide (IV) is expected to be used in applications, such as the electrode of a dye-sensitized solar cell, a storage battery that can be charged with light, a photoelectrode for hydrogen production by water decomposition, a pigment, a coloring agent, a photocatalyst, an antibacterial material, water treatment technologies, and cancer treatment. Lithium titanate is expected to be used in applications like an electrode active material for power storage devices, such as storage batteries and capacitors.

However, these titanium oxides have disadvantages, such as poor electrical conductivity and absorption property capable of absorbing ultraviolet rays only. Hence, researches on complexes which have both the characteristics of titanium oxide and those of other substances, and which compensate the disadvantages of titanium oxide are being advanced.

For example, many researches have been made on the use of carbon having high electrical conductivity as a conductive aid for titanium oxide or lithium titanate (see, for example, Patent Document 1). Such researches are particularly active for power storage devices, such as lithium ion secondary batteries using metal compound particles for the positive electrode and the negative electrode, respectively, and lithium ion capacitors using active carbon for the positive electrode and using a material (e.g., graphene and metal compounds) capable of reversibly adsorbing and desorbing lithium ions for the negative electrode. These power storage devices are applied as power supplies for information devices, such as mobile phones and laptop computers, and also applied for regenerative energy applications in vehicles, etc.

CITATION LIST

Patent Literatures

Patent Document 1: JP 2012-169217 A

SUMMARY OF INVENTION

Technical Problem

However, although the rate characteristics are improved by applying a conductive aid like carbon, the charging and discharging characteristics at a high rate are not sufficient yet. In addition, when the conductive aid like carbon is applied, this results in a technical problem such that energy density decreases.

Hence, an objective of the present disclosure is to provide novel titanium oxide particles, production method thereof, and applications which are capable of improving the rate characteristics, and which do not need a conductive aid or minimize the conductive aid.

Solution to Problem

In order to accomplish the above objective, a novel titanium oxide particles according to the present disclosure includes a three-dimensional network structure having crystallites of titanium oxide coupled in sequence, wherein a magneli phase is formed on surfaces of the crystallites.

Accordingly, the titanium oxide particles have an electron path including the magneli phase, an energy storing space in the particles, and an ion path to the energy storing space.

The titanium oxide may be lithium titanate represented by a general formula of $Li_\alpha Ti_\beta O_\gamma$. The titanium oxide may be spinel type lithium titanate represented by $Li_4Ti_5O_{12}$. Accordingly, the titanium oxide particles have both the characteristics of lithium titanate and those of the magneli phase.

The magneli phase is a titanium oxide represented by a general formula of $Ti_nO_{2n-1}$, where $3 \leq n \leq 10$. The magneli phase may be $Ti_4O_7$. In particular, $Ti_4O_7$ has an electrical conductivity that is 2.75 times as much as that of carbon.

A plurality of spaces may be formed in the three-dimensional network structure. A plurality of pores in communication with an interior of the three-dimensional network structure may be formed between the crystallites. Accordingly, the ion path in communication with the spaces from the pore is formed.

The crystallites may be coupled with each other without a grain boundary. The conductivity is improved since the grain boundary resistance is reduced.

Carbon may be less than 5 wt % including zero relative to the whole particles. The need of conductive aid is eliminated or the conductive aid is minimized.

The crystallite may be in a flat plate shape, and the three-dimensional network structure may be a card house structure. It is further desirable that the magneli phase should be formed on an edge surface of the crystallites.

This titanium oxide particle is optimal for, for example, an electrode of a power storage device, and a power storage device including this electrode.

Carbon is burned out by performing a heating process on a complex of crystallites of a titanium oxide with the carbon under an oxygen atmosphere to cause the crystallites of the titanium oxid to be in sequence, thereby forming a particle employing a three-dimensional network structure, and also forming a magneli phase on a surface of the crystallites.

It is preferable that a temperature of the heating process should be 400 to 600° C. A time of the heating process is equal to or longer than 0.5 and equal to or shorter than 10 hours. Accordingly, the characteristics of the magneli phase on the surface can be achieved without deteriorating the characteristics of the titanium oxide forming the crystallite as a whole.

The complex may be produced a mixing process of a source of the titanium oxide with a carbon source; and a process of heating a mixture having undergone the mixing process under an inert atmosphere. A temperature of the heating process under the inert atmosphere may be 600 to 950° C. The mixing process may include a mechanochemical process on the titanium oxide source and the carbon source in a solution. Accordingly, a complex that has a bonding degree appropriate for a transformation to the magneli phase is easily obtained.

Advantageous Effects of Invention

The titanium oxide particles according to the present disclosure has an electron path including the magneli phase, an energy storing space inside the particle, and an ion path to the energy storing space. No conductive aid is required, or the conductive aid is minimized, and this titanium oxide particles are suitable for the electrode of a power storage device, the electrode of a dye-sensitized solar cell, a storage battery that can be charged by light, and a photoelectrode for hydrogen production by water decomposition.

DESCRIPTION OF EMBODIMENTS (Titanium Oxide Particle Structure)

Figure 1:
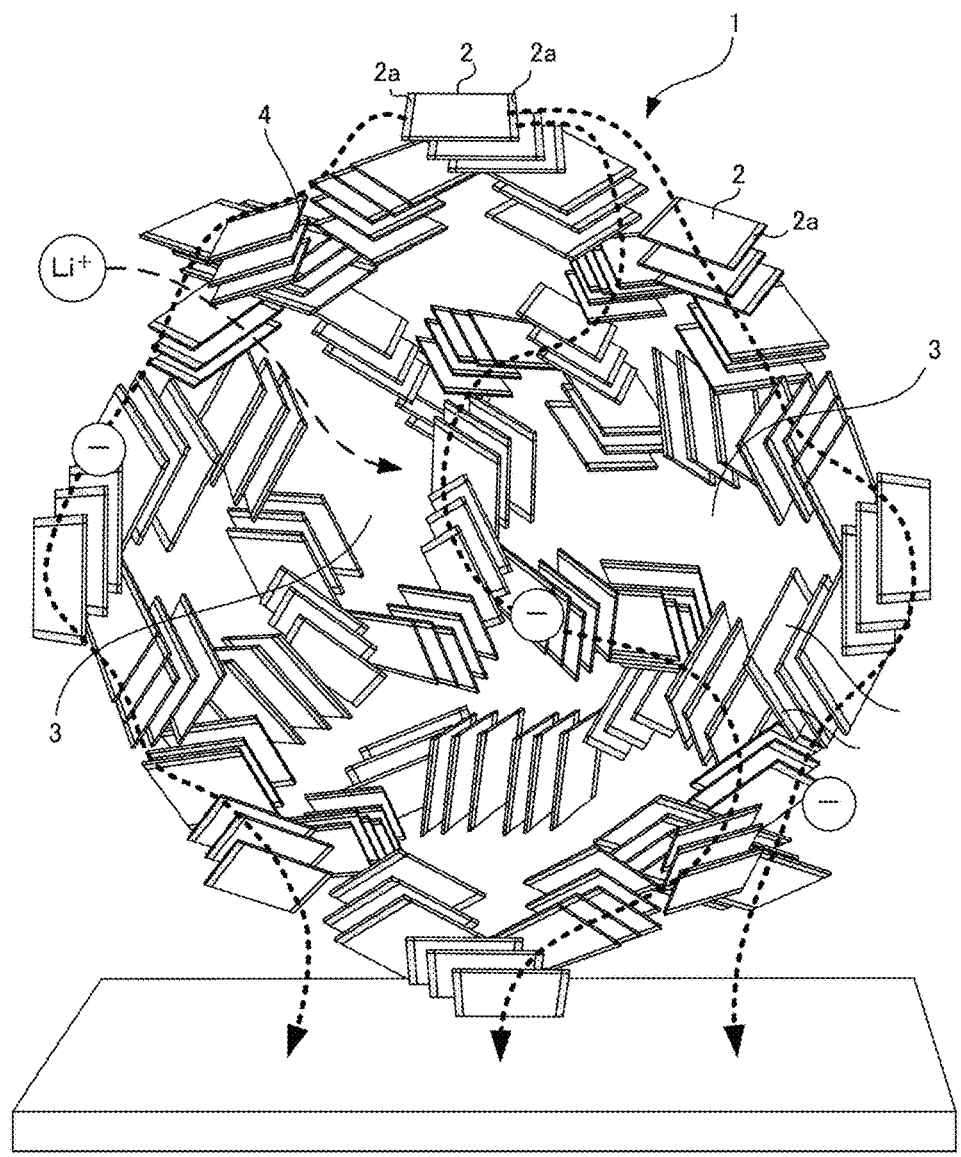
FIG. 1 is a conceptual diagram illustrating novel titanium oxide particles.

As illustrated in FIG. 1, a novel titanium oxide particle 1 according to the present disclosure is a granule in which multiple crystallites 2 are coupled in sequence to form a three-dimensional network structure, and the crystallite 2 has a magneli phase 2a on a part of its surface. The crystallites 2 are randomly oriented and coupled to each other via the surfaces, such as a pinacoid or an end surface. When the crystallite 2 is in a flat plate shape, the three-dimensional network structure is a card house structure. A large number of nano-size spaces 3 are present inside the titanium oxide particle 1. A grain boundary at the bonding interface of the crystallites 2 is eliminated, while a large number of microscopic pores 4 are present between the crystallites 2.

The crystallite 2 is the largest collection that can be regarded as a single crystal of titanium oxide. The crystallite 2 has a flat plate shape of a triangular shape, a rectangular shape or other polygonal shapes, a polyhedron shape having a thickness, or a shape defined by a spherical shape, an ellipsoidal shape, or other curved surfaces. The surface of the crystallite 2 is an edge surface when the crystallite 2 is a flat plate or a polyhedron, and is a side portion or an end portion of the facet surface. One or more of the side portions or the end portions of the crystallite 2 are transformed into the magneli phase 2a. A part of the entire length of the side portion or the end portion of the crystallite 2 or the entire length thereof is the magneli phase 2a. The magneli phase 2a may be contained in a part of the facet surface. In addition, the surface of the crystallite 2 is a single or multiple partial regions of the surface when the crystallite 2 is formed with a curved surface.

The titanium oxide constituting the crystallite 2 is titanium oxide represented by the general formula of $Ti_nO_{2n}$, and titanium oxide compound represented by the general formula of $M_\alpha Ti_\beta O_\gamma$. The symbol M is a metal. Example titanium oxide compounds are lithium titanate, lead titanate, barium titanate, lead zirconate titanate, potassium titanate, vanadium titanate, strontium titanate, calcium titanate, magnesium titanate, and aluminum titanate. Titanium oxide is an anatase type or rutile type titanium oxide (IV) represented by, for example, $TiO_2$. The titanium oxide compound is, for example, spinel type lithium titanate represented by, for example, $Li_{4+w}Ti_5O_{12}$ (0≤w≤3) or a ramsdellite type lithium titanate represented by $Li_{2+y}Ti_3O_7$ (0≤y≤3).

The magneli phase 2a is a titanium oxide represented by the general formula of $Ti_nO_{2n-1}$ (3≤n≤10). This magneli phase 2a is, for example, $Ti_4O_7$, a mixed phase of $Ti_4O_7$ with $Ti_5O_9$, or a mixed phase of an elementary substance or equal to or greater than two substances selected from compounds represented by the general formula of $Ti_nO_{2n-1}$ (3≤n≤10).

When the base material of the crystallite 2 is lithium titanate, the titanium oxide particle 1 has both the characteristics of lithium titanate and the characteristics of the magneli phase 2a. Lithium titanate has an energy storage function by insertion and desorption of lithium ions. Since the volume change by insertion and desorption is substantially 1%, capacity deterioration is little. Since the charging and discharging potential is substantially 1.5 V (vs Li/Li+), side reactions, such as decomposition of an electrolytic solution and precipitation of lithium metal due to rapid charging and discharging hardly occur, and thus the cycle characteristics are excellent. When the crystallite 2 is lithium titanate, the titanium oxide particle 1 has an advantage as an active material of such an electrode. However, lithium titanate has the lower electrical conductivity than that of carbon. Conversely, the magneli phase 2a has a high electrical conductivity, and $Ti_4O_7$ has the electrical conductivity that is 2.75 times as much as that of carbon. That is, this titanium oxide particle 1 has the characteristics to which the high electrical conductivity is given by the magneli phase 2a while maintaining the performance of the active material as lithium titanate.

In addition, the titanium oxide particle 1 includes the three-dimensional network structure in which the high-conductive magneli phase 2a is present on the surface of the crystallite 2, and the crystallites 2 are joined in sequence via the surfaces, such as a pinacoid and an end surface. Hence, each crystallite 2 is partially connected via the magneli phase 2a. Examples of the connection are a case in which the magneli phase 2a are connected to each other, a case in which the magneli phase 2a and the surface other than the magneli phase 2a are connected, and a combination thereof. Hence, an electron path covering the magneli phase 2a is formed in the titanium oxide particle 1 without a conductive aid like carbon, and the titanium oxide particle 1 as a whole also has the high electrical conductivity. Since carbon is unnecessary or a little amount of carbon is necessary, a reduction of the energy density can also be suppressed.

In addition, the titanium oxide particle 1 has the nano-size space 3 that serves as a reservoir for the electrolytic solution. In the nano-size space 3, since the large number of pores 4 are formed between the crystallites 2, an ion path for lithium ions is also secured. Still further, there is no grain boundary at the bonding interface between the crystallites 2, and the grain boundary resistance is little. Accordingly, the titanium oxide particles 1 are suitable for, e.g., the electrode of a power storage device, the electrode of a dye-sensitized solar cell, a storage battery that can be charged by light, and a photoelectrode for hydrogen production by water decomposition.

The crystallite 2 desirably has an average size of 5 to 100 nm, a thickness of equal to or less than 1 nm in the level of 2 to 5 atomic layers when in a flat plate shape, and a side of the two-dimensional surface spreading to 5 to 100 nm. The titanium oxide particle 1 preferably has a size of substantially 500 nm to 5 μm by the multiple crystallites 2 coupled to each other. When the particle is in this size, a handling as an electrode material is facilitated. The size of the crystallites 2 and that of the titanium oxide particle 1 can be adjusted based on the temperature and time in the heating process.

It is preferable that each pore should be substantially 5 to 100 nm. In the differential pore volume converted from the pore distribution measured by a nitrogen gas adsorption measurement scheme, the differential pore volume at the pore diameter within the range of 10 to 40 nm has a value that is equal to or greater than 0.01 $cm^3/g$, in particular, has a value that is equal to or greater than 0.02 $cm^3/g$, an ion path for microscopic lithium ions is achieved, the area of the crystallite 2 in contact with the electrolytic solution increases, and thus the rate characteristics when applied for the electrode improves.

Note that when the titanium oxide particles 1 are produced by burning out carbon as will be described later, the residual amount of the carbon is ideally zero, but is preferably less than 5 wt % by weight with respect to the titanium oxide particles 1. By setting such a range, a reduction of energy density due to the presence of carbon can be suppressed.

(Production Method of Titanium Oxide Particles 1)

Figure 2:
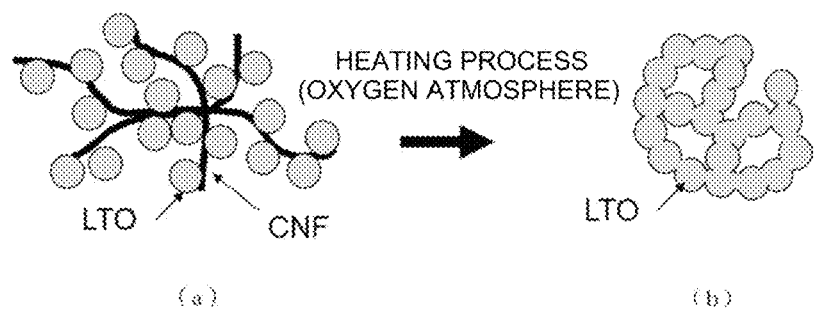
FIG. 2 is a conceptual diagram illustrating generation of titanium oxide particles.

The titanium oxide particles 1 can be obtained by performing a heating process on a complex of the crystallite 2 of titanium oxide and carbon under an oxygen atmosphere. As illustrated in FIG. 2, carbon is burned out from the complex by the heating process on the complex under the oxygen atmosphere, and the crystallites 2 are sintered with each other. In addition, by performing the heating process on the complex under the oxygen atmosphere, the surface of the crystallite 2 is transformed into the magneli phase 2a, and thus the titanium oxide particles 1 are produced.

In this heating process, carbon is combined with oxygen in the atmosphere, and is burned. In addition, although not limited to this mechanism, carbon is converted to carbon monoxide Co or carbon dioxide $CO_2$ by desorbing oxygen atoms of titanium oxide from the bonding interface and titanium is reduced, and lithium is gasified to $Li_2O$ by taking out the oxygen atom from the titanium oxide. By these reactions, oxygen desorption occurs until Ti:O becomes n:2n+2 to n:2n−1, lithium is gasified, and lithium titanate constituting the surface of the crystallite 2 is transformed into the magneli phase 2a.

Hence, in this heating process, the bonding degree of carbon and crystallite, the oxygen concentration, the burning temperature and the burning time may be determined based on the size of the titanium oxide particle, the degree of carbon removal, the transformation to the magneli phase 2a by the above reaction, and the transformation ratio.

That is, in this heat process, it is preferable to set the heat process temperature within the range from equal to or higher than 400 to equal to or lower than 600° C. In addition, it is preferable to maintain the heat process time from equal to or longer than 0.5 to equal to or shorter than 10 hours. At a temperature lower than 400° C., and a heat process time of less than 0.5 hours, removal of carbon becomes insufficient, and thus a decrease in energy density becomes remarkable. Still further, the temperature lower than 400° C. and the heating process time less than 0.5 hours may not facilitate a transformation to the magneli phase 2a, and satisfactory high electrical conductivity cannot be given to the titanium oxide particles 1.

In the case of the heating process at the temperature exceeding 600° C. and exceeding 10 hours, aggregation of titanium oxide progresses, and voids in the titanium oxide particles 1 decrease. In addition, in the heating process at the temperature exceeding 600° C. and exceeding 10 hours, the transformation to the magneli phase 2a excessively proceeds, and even high electric characteristics are given, the characteristics of titanium oxide may be deteriorated. Still further, in the crystallites 2 obtained by setting such a temperature range and such a time as described above, an average size are maintained at 5 to 100 nm, and particle growth from the average size of titanium oxide prior to the heating process is suppressed.

Note that as for the oxygen atmosphere, a mixed atmosphere with nitrogen, etc., is also applicable, and an atmosphere in which equal to or greater than 15% of oxygen, etc., is present like the air is preferable. In the heating process under the oxygen atmosphere, since the amount of oxygen is decreased by the burning of carbon, oxygen may be appropriately supplied into a heating process furnace so as not to disturb oxygen desorption.

The complex of the crystallites 2 of titanium oxide with carbon can be obtained through, for example, a process of mixing a material source of titanium oxide with a carbon source, and a heating process on the mixture under an inert atmosphere. When the process starts from the formation of such a complex, in general, the titanium oxide particles 1 can be obtained through the mixing process of the material source of titanium oxide with the carbon source, a first heating process on the mixture under the inert atmosphere, and a second heating process under an oxygen atmosphere on the mixture having undergone the first heating process. Materials burning out like carbon, and causing oxygen desorption or lithium desorption in addition to oxygen desorption may be combined with titanium oxide instead of carbon.

When the crystallites 2 are constituted by lithium titanate, in the mixing process, a formation of a precursor of lithium titanate, and composition of the precursor of lithium titanate with the carbon source are progressed by composition schemes,
such as mechanochemical process, spray dry process, or stirring process. The precursor of lithium titanate is $Ti_\beta O_\gamma$ or the constituent compound thereof. $Ti_\beta O_\gamma$ or the constituent compound thereof may follow the stoichiometric proportion of titanium oxide, and for example, in the case of lithium titanate that is $Li_4Ti_5O_{12}$, it is appropriate if the atom ratio of Ti and O becomes 5:12. In the mixing process, a titanium source, such as titanium oxide or titanium alkoxide which can be the precursor of lithium titanate, is applied into a solvent together with the carbon source.

When the crystallites are constituted by titanium oxide, in the mixing process, composition of titanium oxide with the carbon source is progressed by composition schemes, such as mechanochemical process, spray dry process, or stirring process. In the mixing process, together with the carbon source, titanium oxide itself is applied into the solvent.

The carbon source means carbon (powders) itself or a material that becomes carbon by heating process. As for carbon (powders), any carbon material having conductivity can be applied without a particular limitation. For example, carbon black, such as Ketjen black, acetylene black and channel black, fullerene, carbon nanotube, carbon nanofiber, amorphous carbon, carbon fiber, natural graphite, artificial graphite, graphitized Ketjen black, mesoporous carbon, and vapor phase method carbon fiber are applicable. Among those materials, a carbon material having a particle diameter in nano size is preferable.

A material that becomes carbon by the heating process is an organic substance which is deposited on the surface of the source material of the crystallite 2, and is converted into carbon by a later heating process. Example organic substances are polyalcohol (e.g., ethylene glycol), polymer (polyvinyl alcohol, polyethylene glycol, polyvinyl pyrrolidone, etc.), sugar (glucose, etc.), and amino acid (glutamic acid etc.).

The mixing ratio or carbon is preferably within the range between 95:5 and 30:70 in ratio by weight of the titanium oxide particles 1 and carbon. Within this range, pores and spaces in the titanium oxide particles 1 obtained eventually can be increased.

The solvent is not limited to any particular one as long as it does not give an adverse effect to the reactions, and water, methanol, ethanol, isopropyl alcohol, etc., can be suitably applied. Equal to or greater than two kinds of solvents may be mixed and applied.

In mechanochemical process, shear stress and centrifugal force are applied to the solution in a rotating reactor. As a reactor, a reactor, as described in FIG. 1 of JP 2007-160151 A, which consists a concentric cylinder including an outer tube and an inner tube, in which through-holes are provided in a side surface of the rotatable inner tube, and a sheathing board is disposed at an opening of the outer tube, is suitably applicable. In this reactor, the distance between the outer wall of the inner tube and the inner wall of the outer tube should be preferably equal to or smaller than 5 mm, and more preferably equal to or smaller than 2.5 mm. The necessary centrifugal force for forming a thin film is equal to or greater than 1500 N $(kgms^{-2})$, preferably, equal to or greater than 70000 N$(kgms^{-2})$.

Using titanium alkoxide Ti(OR)x as a starting material, when the precursor of lithium titanate is produced by hydrolysis reaction, a reaction inhibitor may be added to the solution. By adding a predetermined compound which forms a complex with titanium alkoxide as the reaction inhibitor, an excessive advance of chemical reaction is suppressed. The reaction is suppressed and controlled by adding, to titanium alkoxide, the predetermined compound like acetic acid that forms a complex with titanium alkoxide in an amount of 1 to 3 mol per 1 mol of the titanium alkoxide to form a complex. Example materials capable of forming a complex with titanium alkoxide are, in addition to acetic acid, carboxylic acid, such as citric acid, oxalic acid, formic acid, lactic acid, tartaric acid, fumaric acid, succinic acid, propionic acid, and replic acid, aminopoly carboxylic acid like EDTA, and complexing agents represented by amino alcohol.

In the spray dry process, first, carbon powders are preferably dispersed in the solvent. As for a dispersing scheme, carbon powders are preferably highly dispersed in the solvent by ultracentrifugation (a process applying shear stress and centrifugal force to the powder in the solution), bead mill, homogenizer, etc. A solution obtained by dissolving the material source of titanium oxide in the solvent in which the carbon powders are dispersed is sprayed and dried on a substrate. The spray dry process is performed at a temperature that does not burn out the carbon powders and at a pressure of substantially 0.1 Mpa. When the material source of titanium oxide is titanium alkoxide, titanium alkoxide is oxidized to form the precursor of lithium titanate, and the precursor of lithium titanate is composited with the carbon powders.

As for the stirring process, the solution is stirred. The powders are preferably pulverized in advance to form nano-level microscopic particles. When polymer is applied as the material that becomes carbon by heating process, a material source of titanium oxide is added to a solvent to which the polymer is added beforehand, and this solution may be stirred. The polymer is preferably adjusted to be within the range between 0.05 to 5 when the weight of the powders as the material source of the titanium oxide product is defined as 1.

It is expected that the precursor of lithium titanate or titanium oxide adsorbs to the carbon source by intermolecular chemical bond, such as ionic bond, metalic bond, hydrogen bond, and van der waals bond, through the above mixing process.

In the first heating process after the mixing process, lithium titanate is formed and crystal of titanium oxide grows on carbon. In the mixing process, when a titanium source is put in, the lithium source is added before this heating process.

Example lithium sources are lithium acetate, lithium nitrate, lithium oxide, lithium carbonate, and lithium hydroxide. The lithium source and the titanium source may follow the stoichiometric proportion of lithium titanate, and for example, in the case of lithium titanate that is $Li_4Ti_5O_{12}$, the titanium source and the lithium source may be added to the solvent in such a way that the atomic ratio of Li to Ti becomes 4:5. In the mixing process, in addition to the titanium source, the lithium source may be put in beforehand.

In this first heating process, the complex obtained in the mixing process is subjected to the heating process under the vacuum or inert atmosphere, such as nitrogen or argon atmospheres. In the heating process under the inert atmosphere, the precursor of lithium titanate is melted and lithium is absorbed, and thus titanium oxide is produced and crystal thereof grows, or titanium oxide is crystallized. The carbon source is carbonized and becomes carbon. The bonding interfaces of carbon and the titanium oxide are subjected to lattice junction by the growth of titanium oxide on carbon. In addition, in this heating process, by processing under the inert atmosphere, burning of carbon that desorbs oxygen atoms from titanium oxide in the second heating process is prevented.

In this heating process, the temperature is maintained within the range between 600 and 950° C. for 1 to 20 minutes under the inert atmosphere in order to prevent the carbon source from being burned out. When, in particular, the titanium oxide is lithium titanate, and when the heating process temperature is lower than 600° C., formation of lithium titanate is insufficient which is not preferable, and when the heating process temperature exceeds 950° C., lithium titanate is clumped and the lithium titanate itself is decomposed which is also not preferable. Heating process in a nitrogen atmosphere is particularly preferable as the inert atmosphere, and nitrogen is doped in titanium oxide particles to increase the conductivity of the metal compound particles.

After performing the heating process under the inert atmosphere, it is preferable that the crystallite 2 of the titanium oxide is within a range between 5 and 100 nm. By using such nano-size microscopic particles, the void ratio of the titanium oxide particles to be described later can be increased, and the number of microscopic pores present in the titanium oxide particles 1 can be increased. In order to achieve such a range, the mixing ratio of the material source of titanium oxide and the carbon source may be adjusted in advance.

Prior to the heating process under this inert atmosphere, preliminary heating process may be performed which maintains the complex having undergone the mixing process at a temperature range between 200 and 500° C. and for 1 to 300 minutes. Depending on the complex obtained by this preliminary heating process, impurities present in the complex can be removed, and a state in which the precursor of titanium oxide is uniformly attached on the carbon source can be achieved. In addition, there is also an effect of promoting the formation of the precursor of titanium oxide.

EXAMPLES

Hereinafter, a first example of the present disclosure will be given, but the present disclosure is not limited to the first example. First, as the first example, the mixing process was performed initially.

20 g of Carbon nanofiber and 245 g of tetraisopropoxy titanium were added to 1300 g of isopropyl alcohol to dissolve tetraisopropoxy titanium in isopropyl alcohol. The weight ratio of titanium alkoxide and carbon nanofiber was selected to be the weight ratio of lithium titanate and carbon nanofiber after the first heating process became substantially 8:2. The obtained liquid was introduced into an inner tube of a reactor that was a concentric cylinder including an outer tube and the inner tube, in which a through holes are provided in the side surface of the inner tube, and a sheathing board is disposed at an opening of the outer tube, the inner tube was rotated for 300 seconds so as to apply centrifugal force of 35000 kgms$^{-2}$ to the liquid, and thus carbon nanofiber was highly dispersed in the liquid.

165 g of Acetic acid and 50 g of lithium acetate were dissolved in a mixed solvent of 145 g of isopropyl alcohol and 150 g of water. The obtained liquid was introduced into the inner tube of the above reactor to prepare the solution. The inner tube was rotated for 300 seconds so as to apply centrifugal force of 35000 kgms$^{-2}$ to this solution to form a thin film of the solution on the inner wall of the outer tube, and shear stress and centrifugal force were applied to the solution.

Next, the first heating process was performed. The contents of the reactor were collected, the solvent was evaporated in air, and further dried at 100° C. for 17 hours. The resultant product obtained by drying was subjected to the preliminary heating process at 400° C. for 30 minutes in nitrogen, and then a heating process at 900° C. for 3 minutes in nitrogen.

Further, the second heating was performed. 100 g of the resultant product obtained by the heating process under the nitrogen atmosphere was subjected to the heating process at 500° C. for 6 hours to obtain a final resultant product.

Figure 3:
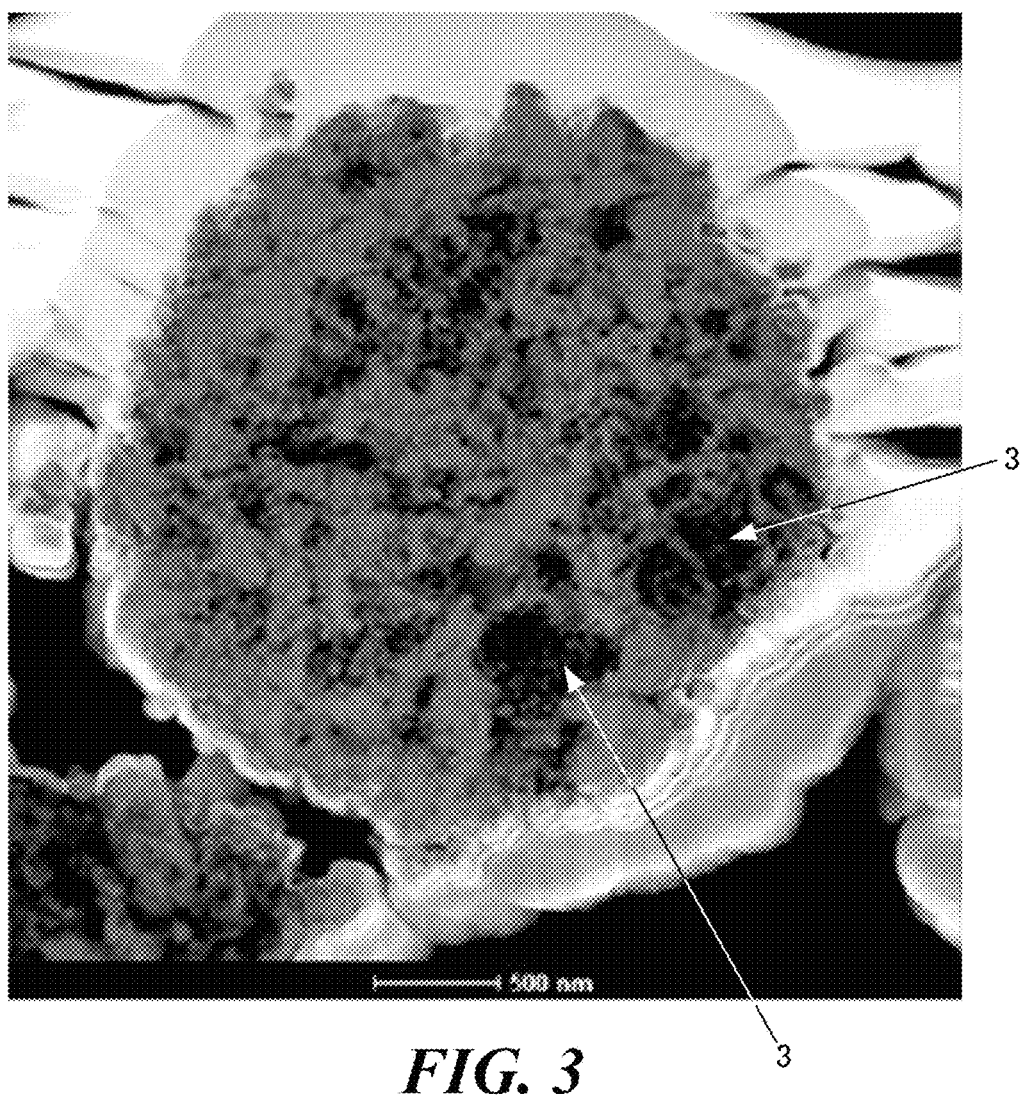
FIG. 3 is a TEM image of a cross-section of the titanium oxide particle according to an example, and the magnification is 10000 times.
Figure 4:
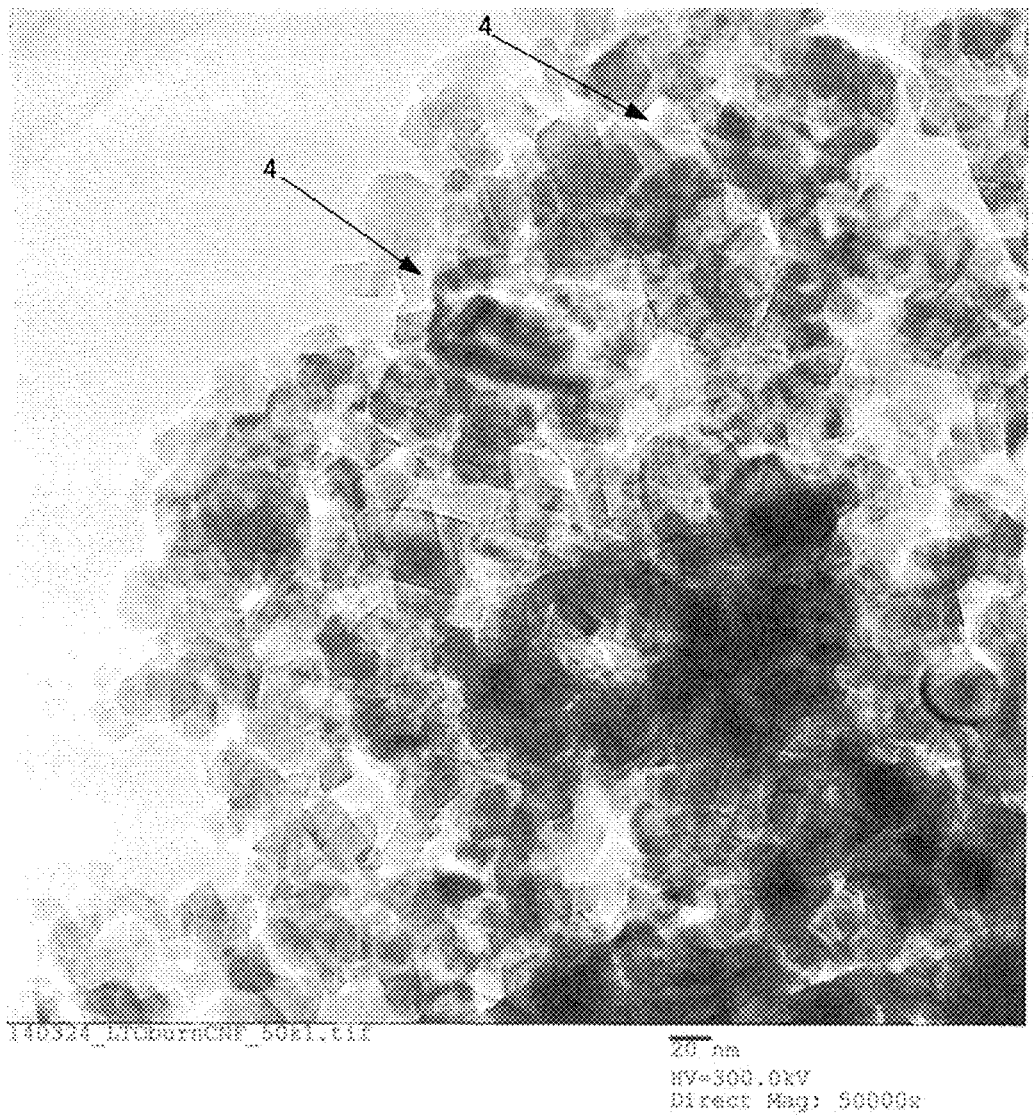
FIG. 4 is an HRTEM image focusing on the crystallite portion of the titanium oxide particles according to the example, and the magnification is 50000 times.
Figure 5:
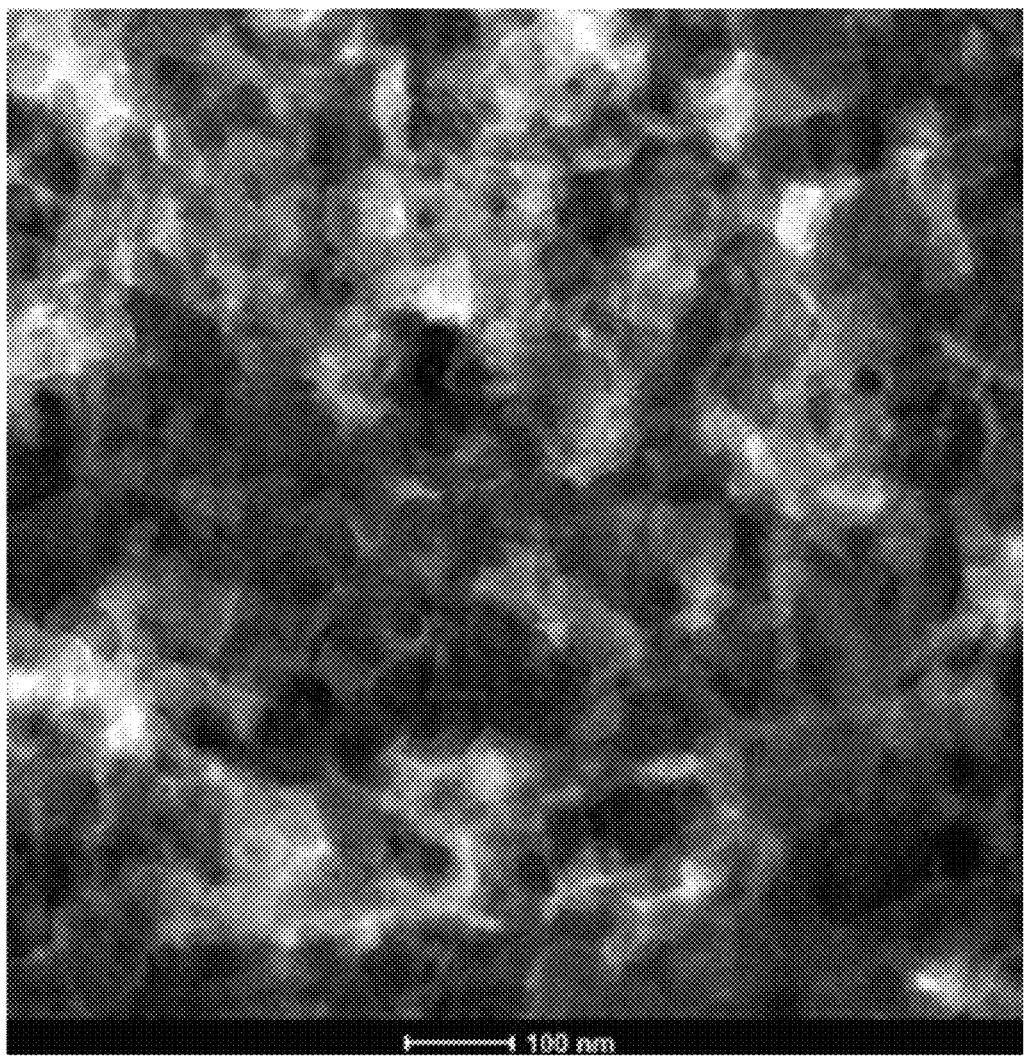
FIG. 5 is an STEM image focusing on the crystallite portion of the titanium oxide particles according to the example.

Next, structural analysis on the final resultant product was performed. First, images of the entire particle and crystallite of the final resultant product were taken by a scanning electron microscope, and the particle structure was analyzed. FIG. 3 is a TEM image of a cross section of the final resultant product, and the magnification is 10000 times. FIG. 4 is an HRTEM image focusing on the crystallite portion of the final resultant product by a high resolution transmission electron microscope, and the magnification is 50000 times. FIG. 5 is an STEM image focusing on the crystallite portion of the final resultant product by a transmission electron microscope.

Figure 6:
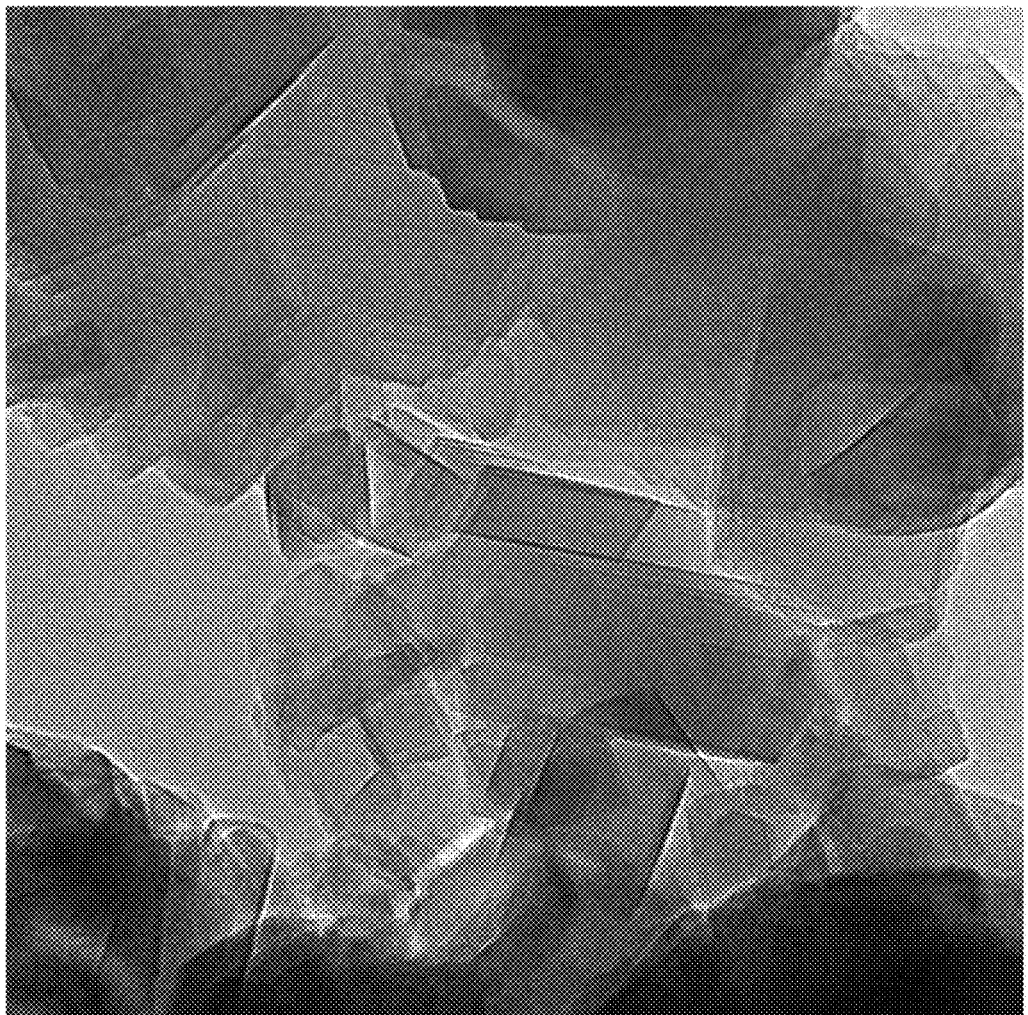
FIG. 6 is an HRTEM image focusing on the crystallite portion of the titanium oxide particles according to the example, and the magnification is 100000 times.
Figure 7:
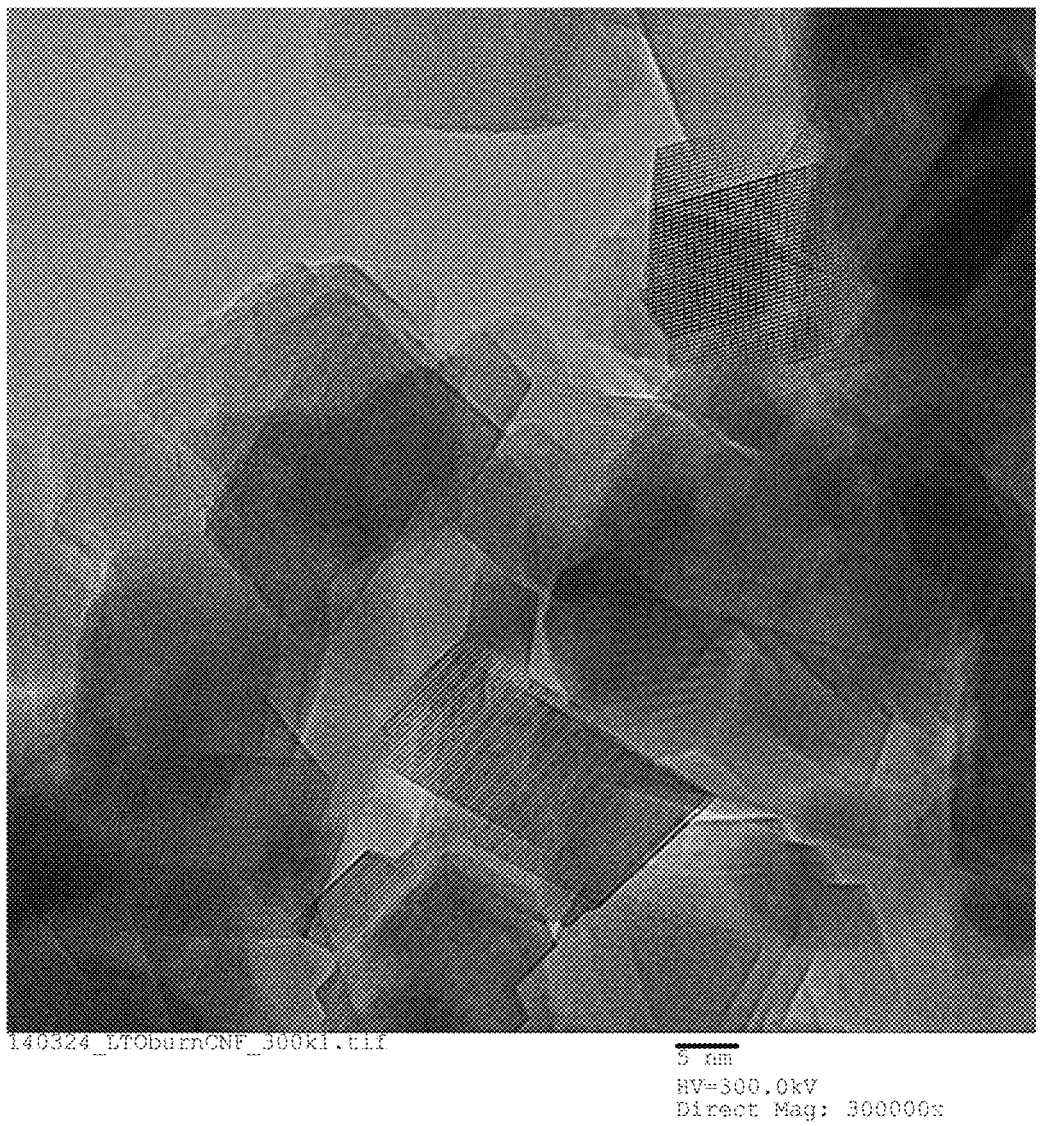
FIG. 7 is an HRTEM image focusing on the crystallite portion of the titanium oxide particles according to the example, and the magnification is 300000 times.
Figure 8:
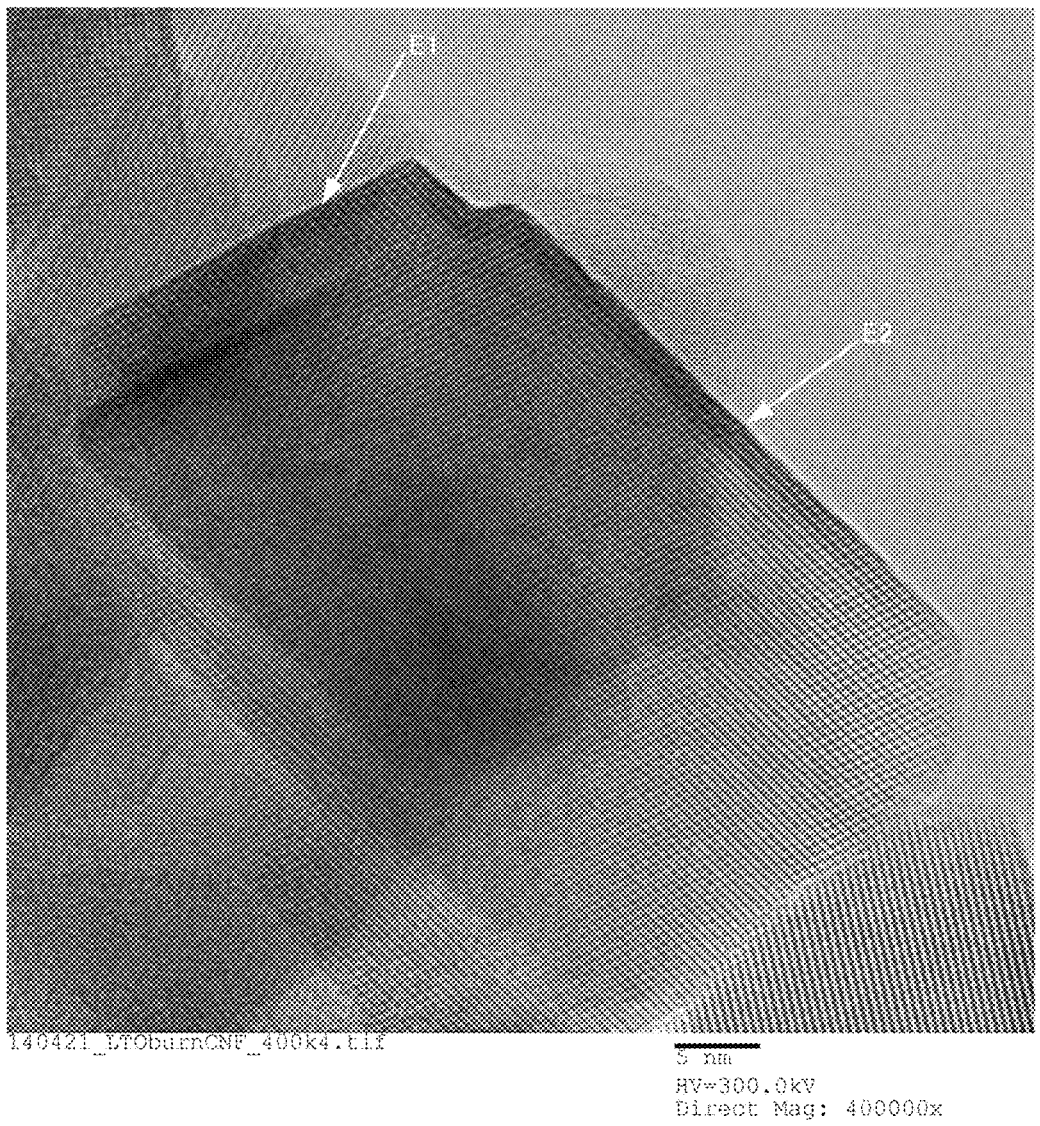
FIG. 8 is an HRTEM image focusing on the crystallite portion of titanium oxide particles according to the example, and the magnification is 400000 times.

FIG. 6 is an HRTEM image focusing on the crystallite portion of the final resultant product by a high resolution transmission electron microscope, and the magnification is 100000 times. FIG. 7 is an HRTEM image focusing on the crystallite portion of the final resultant product by a high resolution transmission electron microscope, and the magnification is 300000 times. FIG. 8 is an HRTEM image focusing on the crystallite portion of the final resultant product by a high resolution transmission electron microscope, and the magnification is 400000 times.

As illustrated in FIG. 3, it becomes apparent that the final resultant product has a size of substantially 1.7 μm, has a three-dimensional network structure as a whole, and has a large number of space portions 3. As illustrated in FIG. 4, it becomes apparent that the final resultant product is a sintered body of the large number of primary particles. The particle size of the most primary particles is substantially 40 nm. In addition, it becomes apparent that a large number of pores 4 are formed between the primary particles. Conversely, as illustrated in FIG. 5, it becomes apparent that grain boundaries are hardly visible between the primary particles.

As illustrated in FIG. 6, it becomes apparent that the primary particles are in a thin-piece shape, and the primary particles are coupled to each other via the pinacoid or the end surface. As illustrated in FIG. 7, it becomes apparent that the lattice of this primary particle is clear, and the primary particle is a crystallite. In addition, as illustrated in FIG. 8, edges E 1 and E 2 of the two sides are darkened entirely relative to the pinacoid of the crystallite, and it becomes apparent that a crystal of substances for pinacoid of the crystallite is different from that for edge of the crystallite.

In view of the above, it becomes apparent that this final resultant product employs a three-dimensional network structure in which the crystallites are coupled in sequence, and the pinacoid of the crystallite and the edge thereof are formed of different substances.

Figure 9:
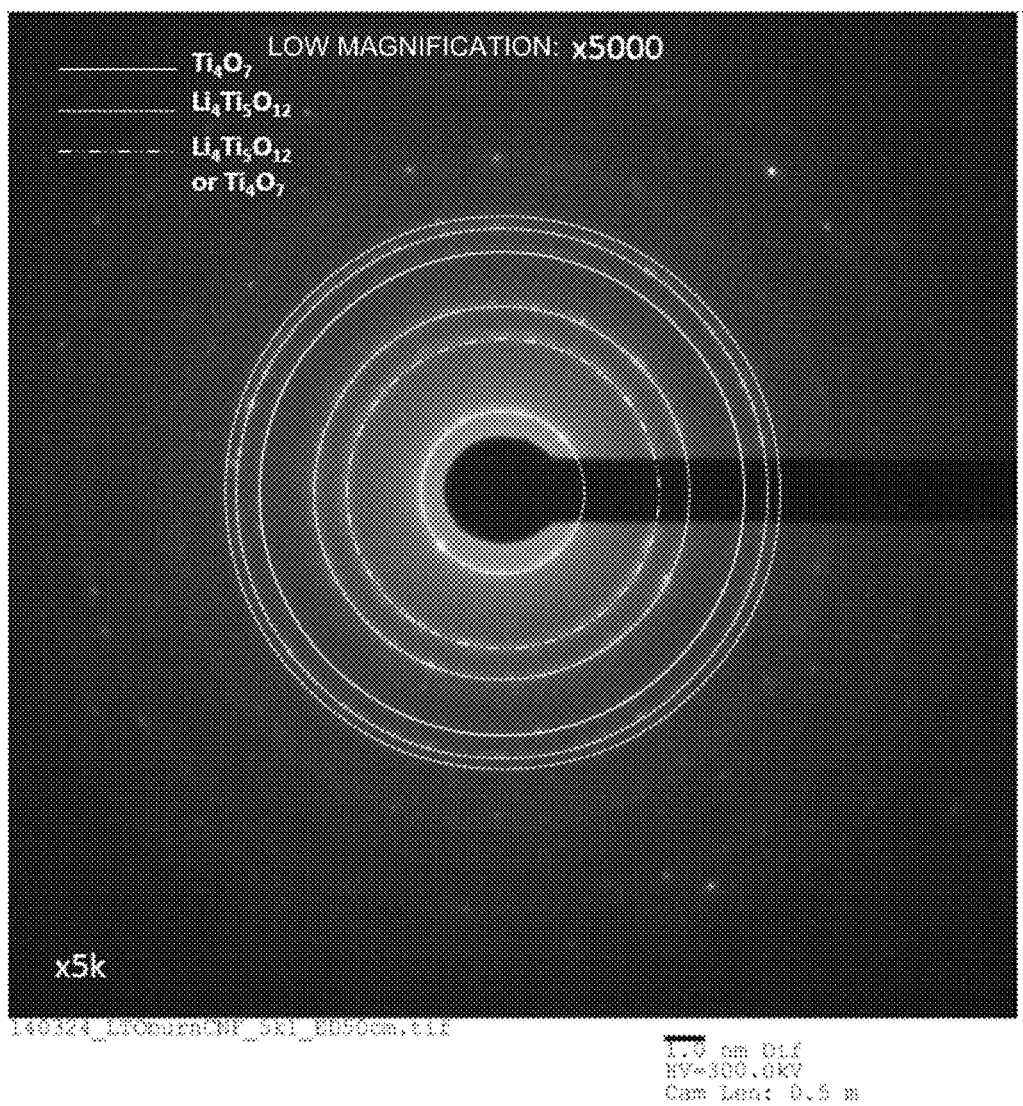
FIG. 9 is a selected area ED diagram at a low magnification of the titanium oxide particles according to the example, and the low magnification is 5000 times.
Figure 10:
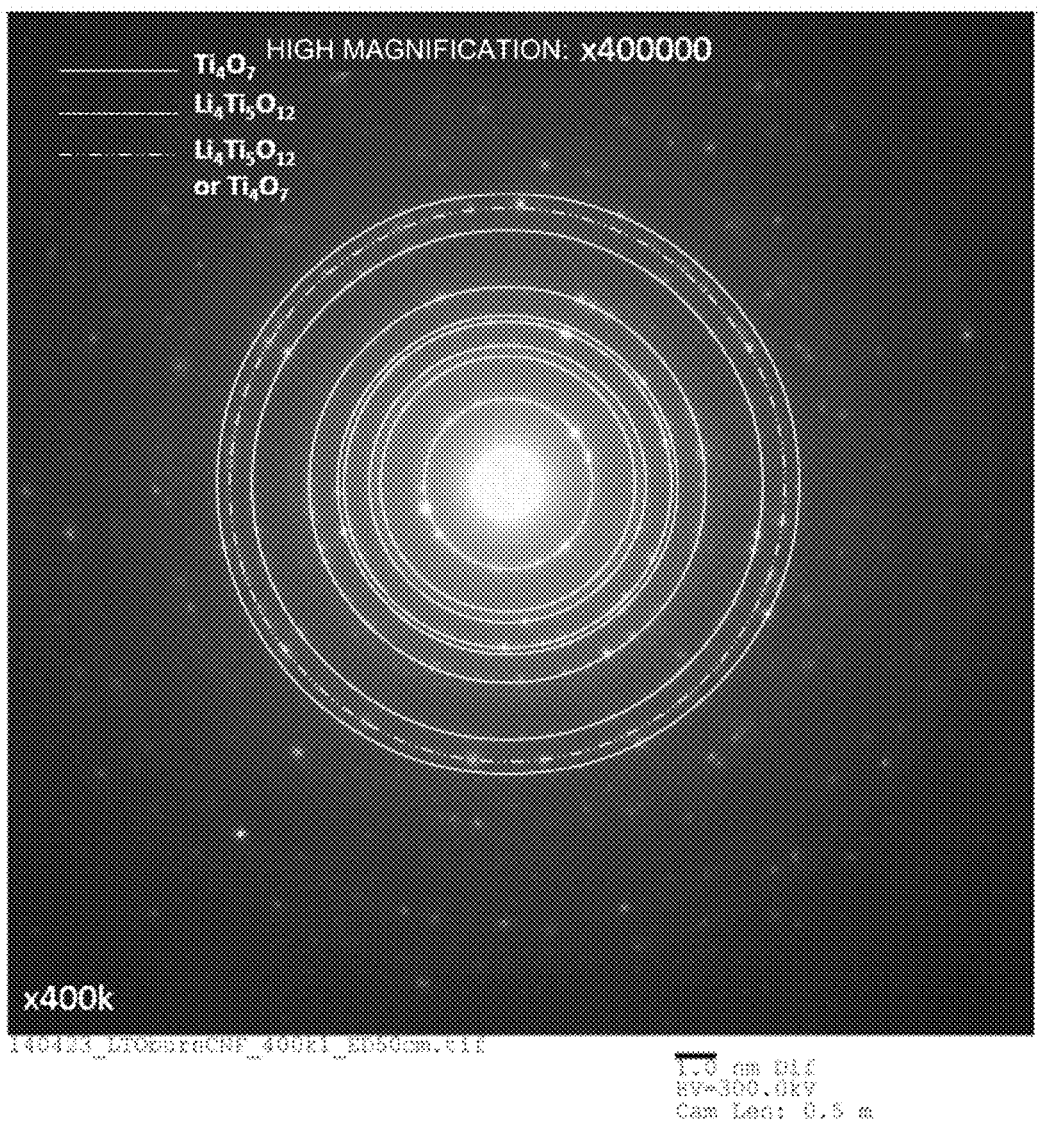
FIG. 10 is a selected area ED diagram at a high magnification of the titanium oxide crystalline body according to the example, and the high magnification is 400000 times.

Next, in order to identify the substance of the pinacoid of the crystallite and that of the edge, the final resultant product was studied by a selected area electron diffraction scheme. FIG. 9 is a selected area ED diagram at a low magnification of the final resultant product, and the low magnification is 5000 times. FIG. 10 is a selected area ED diagram at a high magnification of the final resultant product, and the high magnification is 400000 times.

In view of actual measured values based on the diffraction pattern illustrated in FIG. 9 at the low magnification that is 5000 times and the results obtained by converting the actual measured values into surface spacing d value (Å), and actual measured values based on the diffraction pattern at the high magnification that is 400000 times illustrated in FIG. 10 and the results obtained by converting the actual measured values into the surface spacing d value (Å), most of the crystallites are formed of lithium titanate, but when observed at the high magnification, it becomes apparent that there is a high possibility that a large amount of $Ti_4O_7$ is contained.

Thirdly, by X-ray absorption spectroscopy (XAS) measurement using SPring-8, substances forming the facet surface of the crystallite and the edge thereof were further identified. In the XAS measurement, bulk information on the interior of the crystallite and surface information thereof were separately measured. As for the bulk information, the Ti K-edge XAS transmission scheme (SPring-8) was applied, and as for the surface information, Ti K-edge XAS conversion electron yield scheme (SPring-8) was applied. The same measurements were performed on $Li_4Ti_5O_{12}$ that was a commercially-available product (available from Toho Titania) as a standard sample.

Figure 11:
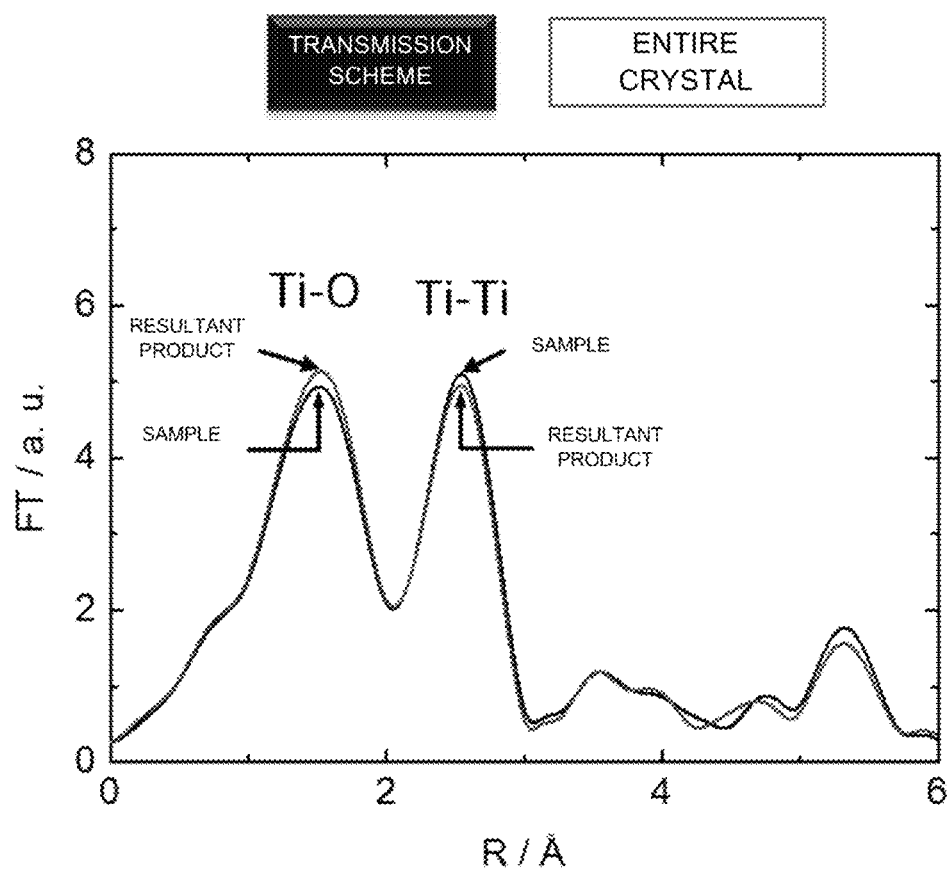
FIG. 11 is a graph illustrating the results of a transmission scheme by Ti K-edge EXAFS with respect to the titanium oxide particles according to the example.

FIG. 11 is a graph illustrating the results of a transmission scheme by Ti K-edge EXAFS. Ti K-edge EXAFS determines the local structure around Ti. A difference between the final resultant product and the standard sample by the transmission scheme was hardly observed. That is, it is apparent that, as for the crystallite as a whole, Ti—O bonding and Ti—Ti bonding are common to the standard sample and the final resultant product, and the crystallite of the final resultant product as a whole is formed of $Li_4Ti_5O_{12}$.

Figure 12:
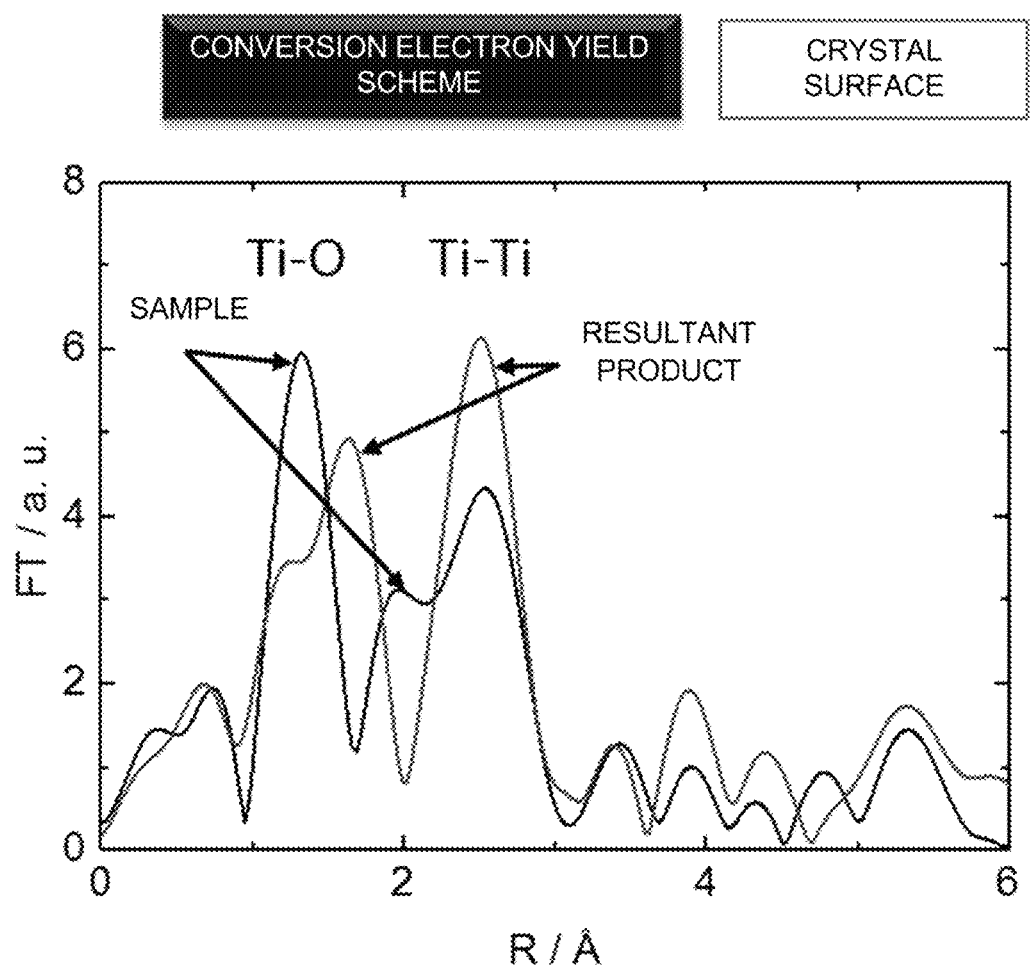
FIG. 12 is a graph illustrating the results of a conversion electron yield scheme by Ti K-edge EXAFS with respect to the titanium oxide particles according to the example.

Conversely, FIG. 12 is a graph illustrating the results by a conversion electron yield scheme by Ti K-edge EXAFS. As illustrated in FIG. 12, as for the Ti—Ti bonding, the standard sample and the final resultant product were consistent, but a change in the Ti—O bonding was observed in the crystallite of the final resultant product. That is, it is apparent that the state of the Ti—O bonding changes on the surface of the crystallite of the final resultant product.

Figure 13:
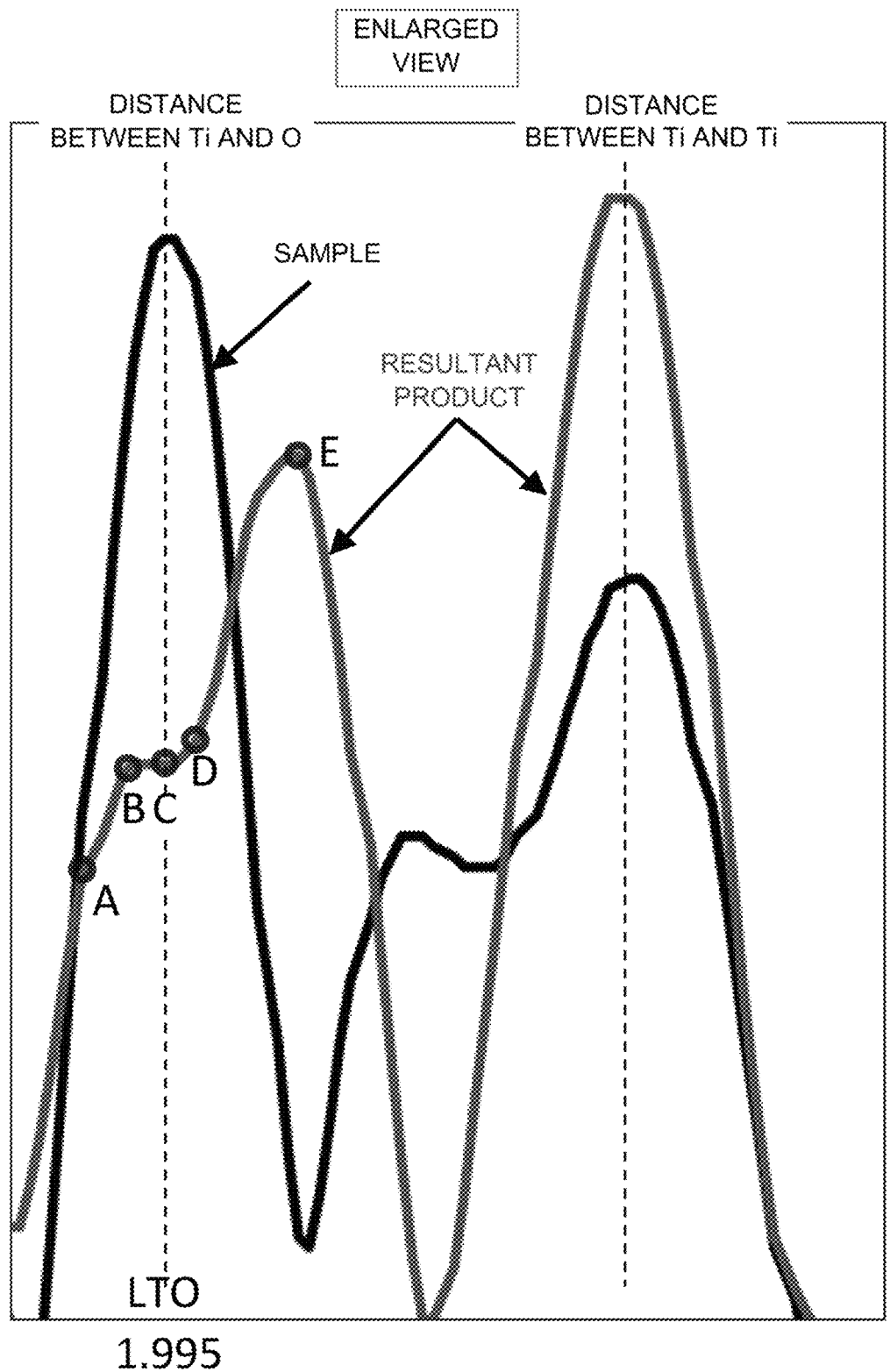
FIG. 13 is an enlarged view of a graph illustrating the results of the conversion electron yield scheme by Ti K-edge EXAFS relative to the titanium oxide particles according to the example.

FIG. 13 is an enlarged view of FIG. 12. As illustrated in FIG. 13, it becomes apparent that there are five peaks in the distance (Å) between Ti and O. A distance between Ti and O of a peak A is 1.713, a distance between Ti and O of a peak B is 1.873, a distance between Ti and O of a peak C is 1.991, a distance between Ti and O of a peak D is 2.053, and a distance between Ti and O of a peak E is 2.317.

Figures 14, 15:
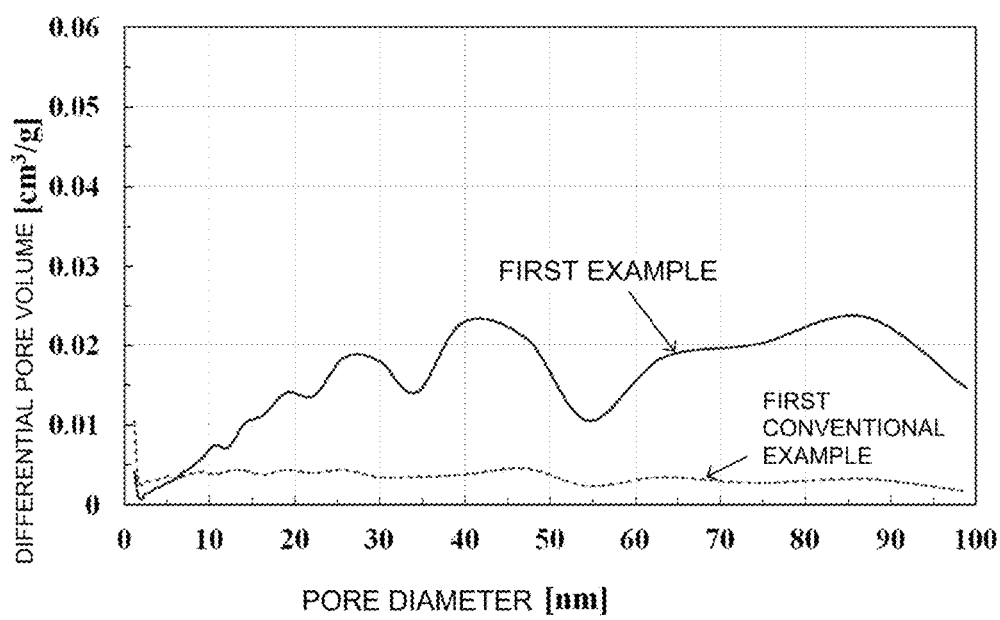
FIG. 14 is a table illustrating a comparison of each peak obtained by the conversion electron yield scheme by Ti K-edge EXAFS with a distance between Ti and O of $Ti_4O_7$.
FIG. 15 illustrates a differential pore volume distribution with respect to the titanium oxide particles of the example and those of the comparative example with the pore diameter being taken as a horizontal axis and the increment of the pore volume between the measurement points being taken as a vertical axis.

A comparison of each peak obtained by the conversion electron yield scheme by Ti K-edge EXAFS with the distance between Ti and O of $Ti_4O_7$ is illustrated in FIG. 14. Since spinel type $Li_4Ti_5O_{12}$ employs a structure in which regular octahedrons overlap, the distance between Ti and O is 1.995 only. $TiO_2$ of rutile and anatase is similar to $Li_4Ti_5O_{12}$. It is known that $T_4O_7$ employs a complicated structure and the distance between Ti and O has peaks at 1.854, 1.934, 1.993, 2.024, 2.063, and 2.156. Comparing the results of the peaks A to E with the distances between Ti and O of $Ti_4O_7$, it becomes apparent that the crystallite surface of the final resultant product is quite similar to $Ti_4O_7$ in the number of peaks and the peak value.

In view of the above, it becomes apparent that the crystallite of the final resultant product is formed of $Li_4Ti_5O_{12}$ as a whole, but the surface of the crystallite is transformed into $Ti_4O_7$. Summarizing the results in FIG. 3 to FIG. 14, it is confirmed that the final resultant product employs a card house structure in which the crystallites 2 of $Li_4Ti_5O_{12}$ are laminated as a whole, and is the titanium oxide particle 1 in which the edge surface of crystallite 2 of $Li_4Ti_5O_{12}$ is transformed into $Ti_4O_7$.

Evaluation on Example

First Conventional Example

As a first conventional example, 87 g of titanium oxide ($TiO_2$) pulverized so as to be a nano size (substantially 200 nm) was added to an aqueous solution containing 38 g of lithium hydroxide and 800 g of water, and the aueous solution was stirred to obtain a solution. This solution was introduced to a spray dry apparatus and spray-dried to obtain a dried product. The obtained dried granulated product was heated in air at a temperature of 700° C. for 3 hours to obtain granules of lithium titanate. Since the granules were carbon free, it is assumed that there was no bonding between carbon and lithium by the heating process, and there was no oxygen desorption by the gasification of each of carbon and lithium, and the magneli phase 2a was not formed. In addition, since carbon was not present during the production process, there was no space where carbon was removed.

(Pore Distribution)

The pore distribution of the titanium oxide particle 1 according to the first example and that of lithium titanate of the first conventional example were measured. As for a measuring scheme, a nitrogen gas adsorption measuring scheme was applied. More specifically, a nitrogen gas was introduced to the pores formed in the particle surface and the interior in communication with the particle surface, and the adsorption amount of nitrogen gas was obtained. Next, the pressure of the introduced nitrogen gas was increased gradually, and the adsorption amount of nitrogen gas relative to each equilibrium pressure was plotted to obtain an adsorption isothermal curve. The measurement was performed using a high-precision gas/vapor adsorption amount measurement apparatus BELSORP-max-N (available from Nippon Bell Co., Ltd.). FIG. 15 illustrates a differential pore volume distribution in which the horizontal axis represents the pore diameter, and the vertical axis represents the increment of the pore volume between measurement points.

As is apparent from FIG. 15, according to the first example, the differential pore volume is larger than that of the first conventional example. It becomes apparent that since the differential pore volume is large in such a small pore diameter range (100 nm), the electrolytic solution enters the interior of the lithium titanate particles 1, and the area of the lithium titanate particles 1 in contact with the electrolytic solution is large. In particular, the differential pore volume with the pore diameter range between 10 and 40 nm has a value that is equal to or greater than 0.01 cm$^3$/g, and further, a value that is equal to or greater than 0.02 cm$^3$/g is obtained.

(Carbon Remaining Amount)

In the second heating process, the heating process was performed at 500° C. for 6 hours according to the first example, whereas, according to a second example, 100 g of the collected material was subjected to the heating process at 350° C. for 3 hours, and according to a third example, 100 g of the collected material was subjected to the heating process at 300° C. for 1 hour. Other conditions were the same in the first to third examples.

Next, the carbon remaining amount was measured for the lithium titanate particles obtained in the first example, the second example, and the third example.

As for the measurement, TG-DTA measurement (differential thermal-thermogravimetric simultaneous measurement) was applied. The results of shelf test on those examples at 60° C. are indicated in table 1. As for the shelf test, each capacitor that was charged at 2.8 V was held for 30 minutes, and then left in an atmosphere at 60° C. for 1500 hours. The discharging capacity when this capacitor was charged and discharged again was calculated as the rate relative to the discharging capacity prior to the test.

In the shelf test, 5 wt % of polyvinylidene fluoride and an appropriate amount of N-methyl-pyrrolidone were added to the titanium oxide particles 1 of the first example, the second example, and the third example and sufficiently kneaded and mixed to form a slurry, the slurry was applied on an aluminum foil, and dried to obtain an electrode. In addition, using the obtained electrode, a laminate-sealed capacitor was produced with 1 M of LiBF$_4$ propylene carbonate solution as an electrolytic solution, and an activated carbon electrode as an opposing electrode.

TABLE 1

|  | Carbon Remaining Amount | Shelf Test |
|---|---|---|
| First Example | Equal to or less than 1% | 83% |
| Second Example | 3% | 72% |
| Third Example | 5% | 66% |

As indicated in table 1, the carbon remaining amount less than 5 wt % is preferable, and in particular, the first example in which the carbon remaining amount that was equal to or less than 1 wt % accomplishes a good result.

(Capacitor Evaluation)

5 wt % of polyvinylidene fluoride and an appropriate amount of N-methyl-pyrrolidone were added to the titanium oxide particles 1 of the first example and the granule products of lithium titanate of the first conventional example, and sufficiently kneaded and mixed to form a slurry, and the slurry was applied on an aluminum foil, and dried to obtain an electrode. In addition, using the obtained electrode, a laminate-sealed capacitor was produced with 1 M of LiBF$_4$ propylene carbonate solution as an electrolytic solution and an activated carbon electrode as an opposing electrode.

Figure 16:
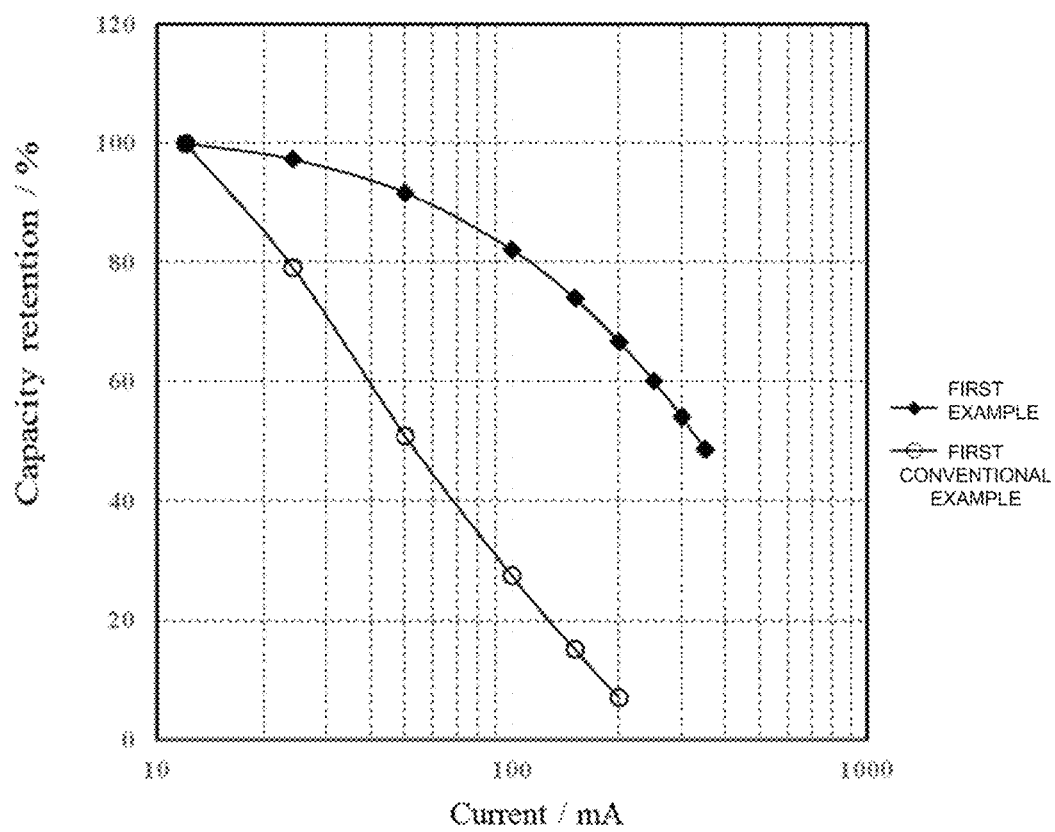
FIG. 16 is a diagram illustrating the relationship between a rate and a capacity retention rate for a capacitor of the example and that of a first comparative conventional example.

FIG. 16 is a graph illustrating a relationship between the rate and the capacity retention rate for the obtained capacitors according to the first example and the first conventional example. As is apparent from FIG. 16, the capacitor according to the first example can obtain the good rate characteristics even at a high rate. In particular, according to the capacitor of the first example, the good rate characteristics are obtained although the electrode does not contain conductive carbon as a conductive aid. For example, at 200° C., the capacitor according to the first conventional example has a capacity retention rate that is less than 10%, whereas the capacitor according to the first example has the capacity retention rate reaching substantially 70%.

REFERENCE SIGNS LIST

1 Titanium oxide particle
2 Crystalline
2a Magneli phase
3 Space
4 Pore

The invention claimed is:

1. A titanium oxide particle comprising:
a three-dimensional network structure having crystallites of titanium oxide coupled in sequence, at least a plurality of the crystallites having a flat plate shape and including a magneli phase and a non-magneli phase, with the magneli phase being formed on at least a part of the crystallite edge surfaces.

2. A titanium oxide particle according to claim 1, wherein at each connection between crystallites in the three-dimensional network, a surface of at least one of the crystallites has the magneli phase connecting the crystallites.

3. A titanium oxide particle according to claim 2, wherein the crystallites of titanium oxide comprise spinel type lithium titanate represented by Li$_4$Ti$_5$O$_{12}$.

4. A titanium oxide particle according to claim 1, wherein the magneli phase is a titanium oxide represented by a general formula of Ti$_n$O$_{2n-1}$, where $3 \leq n \leq 10$.

5. A titanium oxide particle according to claim 4, wherein the magneli phase is Ti$_4$O$_7$.

6. A titanium oxide particle according to claim 1, wherein the sequence of crystallites forms an electron path including the magneli phase.

7. A titanium oxide particle according to claim 1, wherein a plurality of spaces is formed in the three-dimensional network structure.

8. A titanium oxide particle according to claim 7, wherein a plurality of pores in communication with an interior of the three-dimensional network structure is formed between the crystallites.

9. A titanium oxide particle according to claim 8, wherein an ion path in communication with the spaces from the plurality of pores is formed.

10. A titanium oxide particle according to claim 1, wherein the crystallites are coupled with each other without a grain boundary.

11. A titanium oxide particle according to claim 1, wherein carbon is less than 5 wt % including zero relative to the titanium oxide particle.

12. A titanium oxide particle according to claim 1, wherein:
the three-dimensional network structure is a card house structure.

13. An electrode for a power storage device comprising titanium oxide particles according to claim 1.

14. A power storage device comprising an electrode that comprises titanium oxide particles according to claim 1.

* * * * *